(12) United States Patent
Creamer et al.

(10) Patent No.: US 6,175,100 B1
(45) Date of Patent: *Jan. 16, 2001

(54) PRESSURE REGULATOR FOR STEAM OVEN

(75) Inventors: Kurt S. Creamer, Apex; Thomas C. Hotard, Fuquay-Varina; Richard W. Hartzell, Cary; Murray Van Johnson, Lillington, all of NC (US)

(73) Assignee: Middleby-Marshall, Inc., Elgin, IL (US)

( * ) Notice: Under 35 U.S.C. 154(b), the term of this patent shall be extended for 0 days.

This patent is subject to a terminal disclaimer.

(21) Appl. No.: 09/428,029

(22) Filed: Oct. 27, 1999

Related U.S. Application Data

(63) Continuation of application No. 09/131,292, filed on Aug. 10, 1998, now Pat. No. 6,107,605, which is a continuation-in-part of application No. 08/928,105, filed on Sep. 12, 1997, now Pat. No. 5,869,812.

(51) Int. Cl.[7] .............................. A47J 27/16; A21B 1/24; A21B 1/36; F27D 7/02

(52) U.S. Cl. ............................ 219/401; 99/330; 126/20

(58) Field of Search .......................... 219/401; 392/399, 392/400, 403, 405; 126/20, 369, 369.3; 99/330, 380, 468; 426/510, 511

(56) References Cited

U.S. PATENT DOCUMENTS

| | | | |
|---|---|---|---|
| 3,604,895 | * | 9/1971 | MacKay ................................ 219/401 |
| 4,011,805 | * | 3/1977 | Vegh et al. ........................... 126/369 |
| 4,123,969 | * | 11/1978 | Abbate ................................. 219/401 |
| 4,506,598 | * | 3/1985 | Meister ................................. 126/20 |
| 4,722,321 | * | 2/1988 | Meister ................................. 126/20 |
| 4,995,313 | * | 2/1991 | Delau et al. ........................... 99/467 |
| 5,355,840 | * | 10/1994 | Violi ................................... 122/13.2 |
| 5,549,038 | * | 8/1996 | Kolvites ............................... 219/401 |
| 5,631,033 | * | 5/1997 | Kolvites ............................... 426/233 |
| 5,869,812 | * | 2/1999 | Creamer et al. ...................... 219/401 |

FOREIGN PATENT DOCUMENTS

3703539 * 8/1988 (DE) .
7-269879 * 10/1995 (JP) .

* cited by examiner

Primary Examiner—Joseph Pelham
(74) Attorney, Agent, or Firm—Coats & Bennett, PLLC

(57) ABSTRACT

A pressure regulator and steamer oven for cooking food at low pressure includes heating elements and a cooking cavity having a pool for holding water to be turned into steam. A pressure sensor is disposed in a steam outlet passage connected to the cooking cavity. The pressure sensor is operable to turn off the heating elements when the pressure in the steam outlet passage exceeds a pre-determined level. The pressure sensor may be a float switch monitoring the water level in the steam outlet passage. The condensing steam in the steam outlet conduit may be routed back to the pool in the cooking cavity via an overflow.

5 Claims, 6 Drawing Sheets

PRESSURE REGULATOR FOR STEAM OVEN

This is a continuation of application Ser. No. 09/131,292, filed Aug. 10, 1998, now U.S. Pat. No. 6,107,605, which is a continuation-in-part of application Ser. No. 08/928,105, filed Sep. 12, 1997, now U.S. Pat. No. 5,869,812.

FIELD OF INVENTION

The present invention relates to steam cooking ovens and more particularly to pressure regulation in such ovens.

BACKGROUND OF THE INVENTION

Steam ovens, also known as steamers, have been long used to cook food. Steam ovens operate by heating water to generate steam and then circulating the steam within a cooking cavity containing food to cook the food.

Conventional steamers are not pressure cookers; instead, conventional steamer cooking cavities are vented to the atmosphere so that the steam pressure in the cooking cavity is not greater than atmosphere. This arrangement is not thermally efficient. In order to maintain steam in the cooking cavity, steam must be continuously generated to replace that which is vented into the atmosphere. However, the amount of steam required to cook the food varies during cooking. Food can only accept steam energy at a rate that depends on its surface area and temperature. In the initial phase of cooking room temperature or frozen food products the amount of steam required is high. However, when the food products are thereafter in a heated condition, less steam is required to complete the cooking. Thus, when the food cannot absorb all of the steam being generated, the excess steam is wasted. As such, conventional steam cookers typically produce too much steam during the later portions of cooking, when the food is already at an elevated temperature. Thus, conventional steam cookers are not thermally efficient and they consume an excess of water for continuously making steam and cooling exhaust steam.

More efficient cooking performance is achieved when steamers operate at pressures above atmospheric pressure. On the other hand, if high pressure steam is used, then significant structural requirements must be met for safety reasons which increases cost. In addition, high pressure steamers may require certification as pressure vessels. As such, it is desirable for steamers to operate at pressures above atmospheric, but below the level where certification is necessary.

The food cooking industry has long sought efficient low pressure steamers. One recent approach is reflected in U.S. Pat. No. 5,549,038 to Kolvites which discloses a steamer having separate steam generation chambers which uses low pressure to cook food more efficiently. In this device, the steam is not vented directly to the atmosphere for the entire cooking cycle. Instead, a water seal and pressure valve arrangement is used to cause the steam in the cooking cavity to be at a slightly elevated pressure. This pressure is described as being somewhat above atmospheric pressure or one or two inches of water. Also, the device regulates the generation of steam according to the steam pressure so that steam is not continuously produced. When the food is absorbing all the steam, then the pressure will be low and additional steam is produced. When the food is not absorbing all the steam, then the resulting rise in pressure is directly sensed by a normally closed pressure switch which interrupts the steam generation until the pressure drops.

The Kolvites steam cooker has at least two main drawbacks. First, the Kolvites device employs separate steam generation cavities, which requires more space. Second, the Kolvites device does not reuse water that condensed from steam; this condensate is removed to a tempering water tank and then drained therefrom. Other known steamers suffer from these or other drawbacks.

Thus, there remains a need within the industry for efficient, compact low pressure steamers which conserve water.

SUMMARY OF THE INVENTION

The present invention provides an efficient way to cook food in a steamer at low pressure while conserving water and space. In one embodiment, the present invention uses a pressure sensor to regulate the pressure in the cooking cavity and modulate the production of steam accordingly. The cooking cavity of the oven has a pool for holding water to be turned into steam. Heating elements are provided, possibly in the pool, but preferably underneath the pool, which heat the water into steam. A pressure sensor is disposed in a steam outlet conduit connected to the cooking cavity. The pressure sensor may be a float switch that indirectly measures the pressure in the cooking cavity by monitoring the pressure in the steam outlet passage. The lower end of the steam outlet passage is preferably blocked by water that creates a water seal. The float switch is operable to turn off the heating elements when the float of the float switch is in a lower position, such as when pressure in the cooking cavity causes the water level in the steam outlet passage to fall. In another embodiment, the steamer includes a reservoir external to the cooking cavity. The reservoir is connected to the pool via an overflow which allows condensate from the steam outlet passage to be recirculated to the cooking cavity. Because steam is generated directly inside the cooking cavity, no separate steam chamber is required. Also, the recycling of steam condensate from the steam outlet passage to the cooking cavity allows less water to be used.

DETAILED DESCRIPTION

Figure 1:
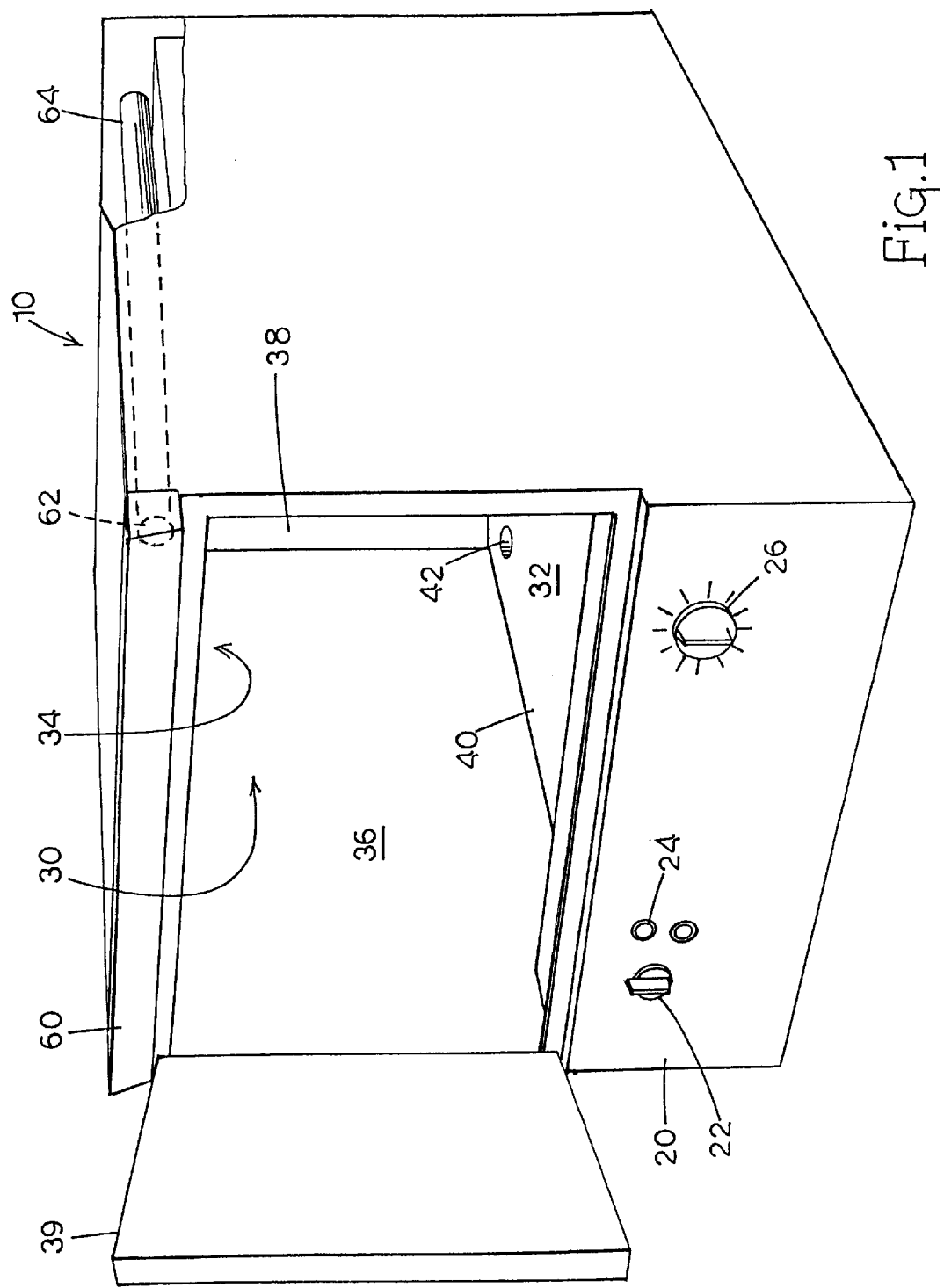
FIG. 1 is a perspective view of the steamer oven without the optional pool cover.

FIG. 1 shows a steamer 10 of the present invention. The steamer 10 includes controls 20, a cooking cavity 30, a door 39, a fill trough 60, and a pressure regulator mechanism 100 (see FIG. 4). The cooking cavity 30 is defined by the door 39, a floor 32, a ceiling 34, sidewalls 36, and a rear wall 38. The floor 32 of the cooking cavity 30 includes a recessed area for holding water known as a pool 40. The portion of floor 32 under the pool 40 is tilted towards the left rear corner of the cooking cavity 30. In that corner is a drain 42 which is connected to a drain valve (not shown) via a T-junction 44. The drain 42 allows the water in the pool 40 to be drained for cleaning of the floor 32.

Figure 3:
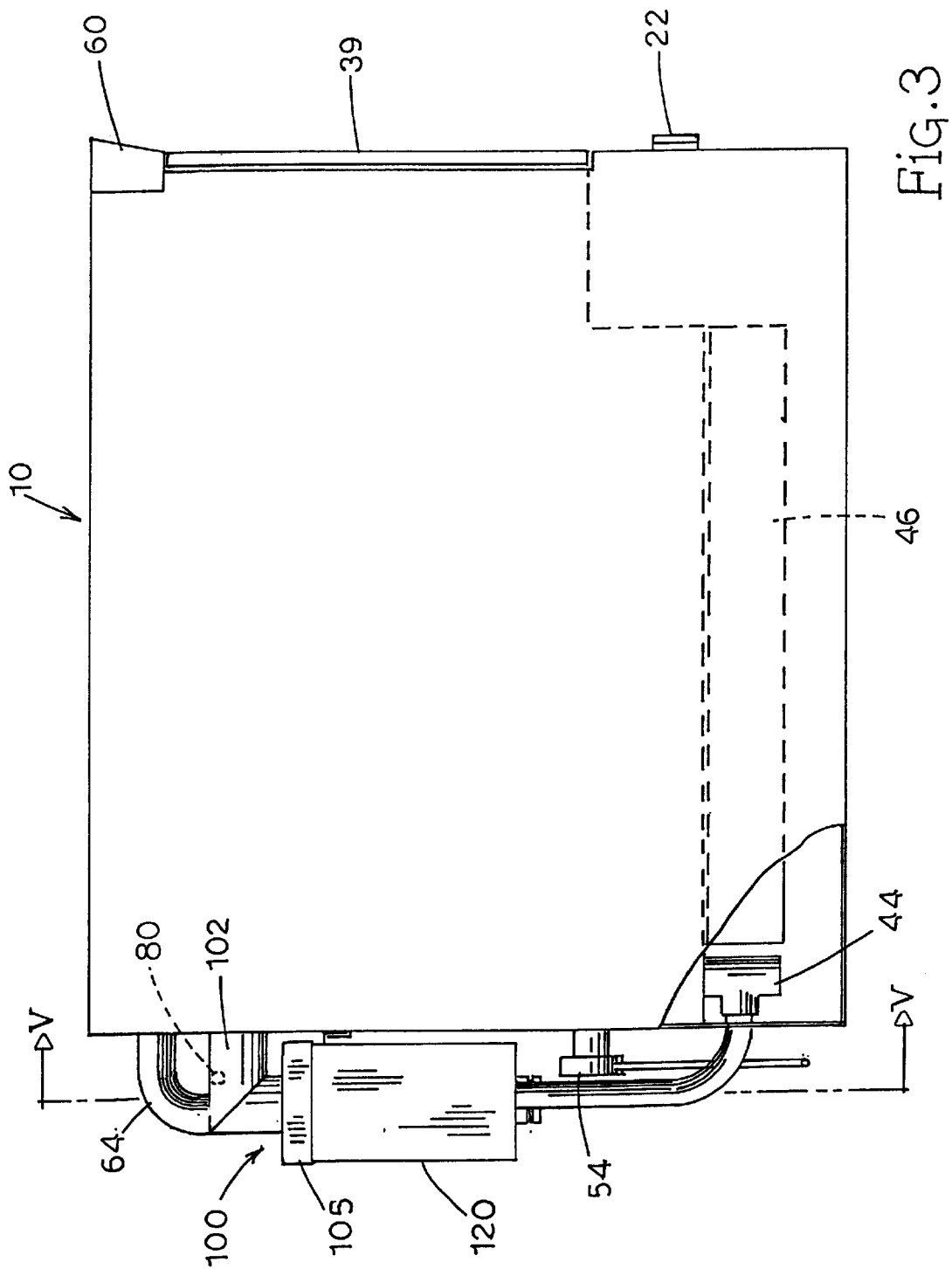
FIG. 3 is a side view of the steamer oven.

Heating elements 46 are provided for heating the water in the pool 40 and turning it into steam. The heating elements 46 are possibly in the pool 40, but are preferably underneath the pool 40 as shown in FIG. 3. The heating elements 46 include a plurality of main heating elements and an optional idle heating element. Heating elements 46 may come in a variety of shapes and sizes. In the preferred embodiment, each heating element is a rectangular shaped block of aluminum with an embedded electrical resistance core (not shown). A plurality of these heating elements 46 are attached to the underside of the floor 32. Optionally, a compressible heat transfer layer (not shown) may be disposed between the heating elements 46 and the floor 32 to accommodate geometrical and thermal irregularities. It should be noted that other heating element 46 arrangements are encompassed by the present invention, including but not limited to common electrical resistance heaters, film resistance heaters, induction heaters, and gas heaters.

Associated with the heating elements 46 are safety temperature limit switches (not shown). The temperature limit switches are fastened directly to the heating elements 46. The purpose of the safety temperature limit switches is to prevent unsafe overheating of the heating elements 46. The use of temperature limit switches in this manner is well known in the art.

Connecting to the rear wall 38 of the cooking cavity 30, on a upper portion thereof, is a steam outlet conduit 102. The conduit 102 is preferably a tube having a downward 90° turn (see FIG. 3). The conduit 102 extends rearwardly from the cooking cavity 30, turns and then has a lower portion 102a extending downwardly for some distance.

Figure 2:
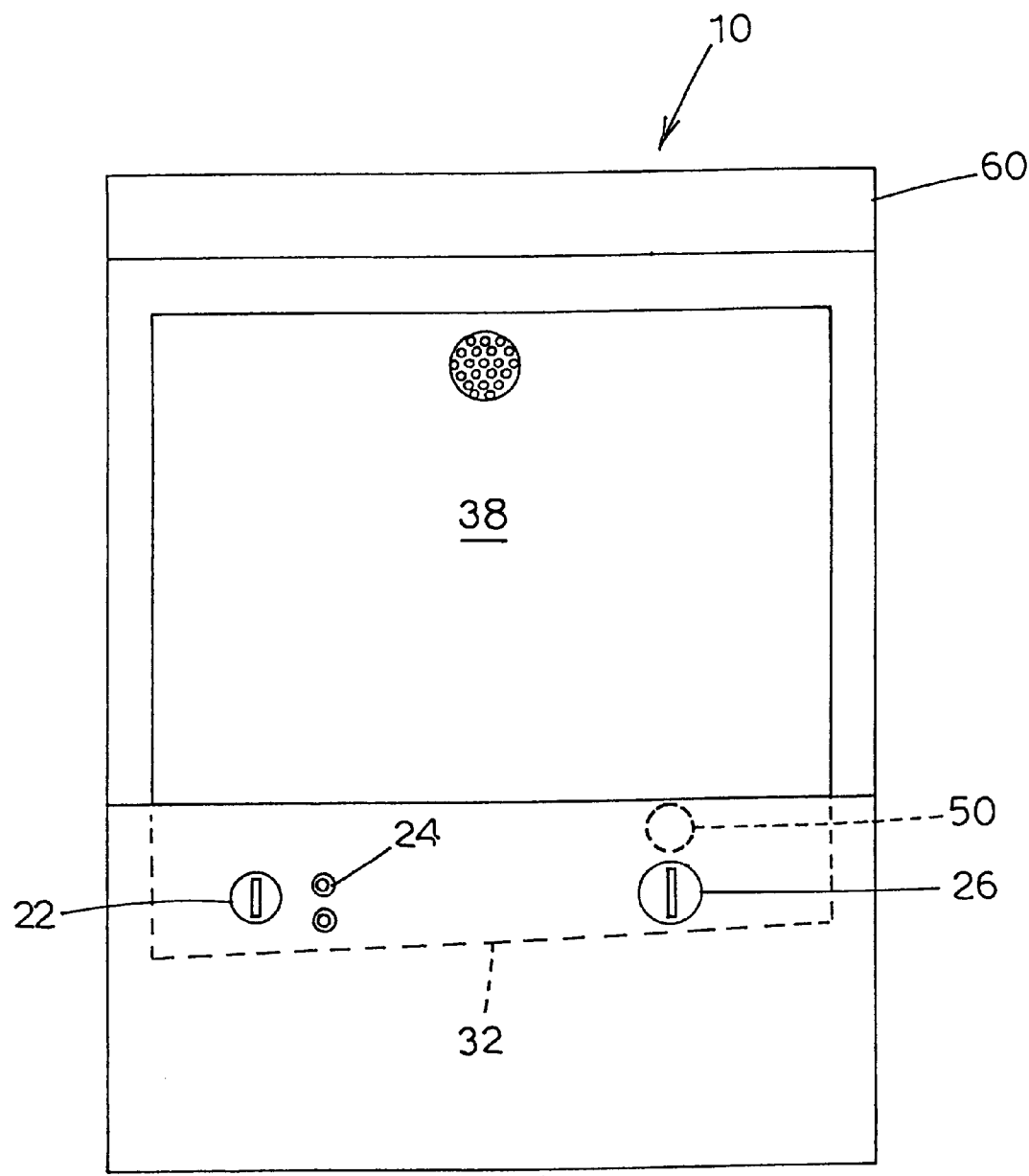
FIG. 2 is a front view of the steamer oven without the door.
Figure 4:
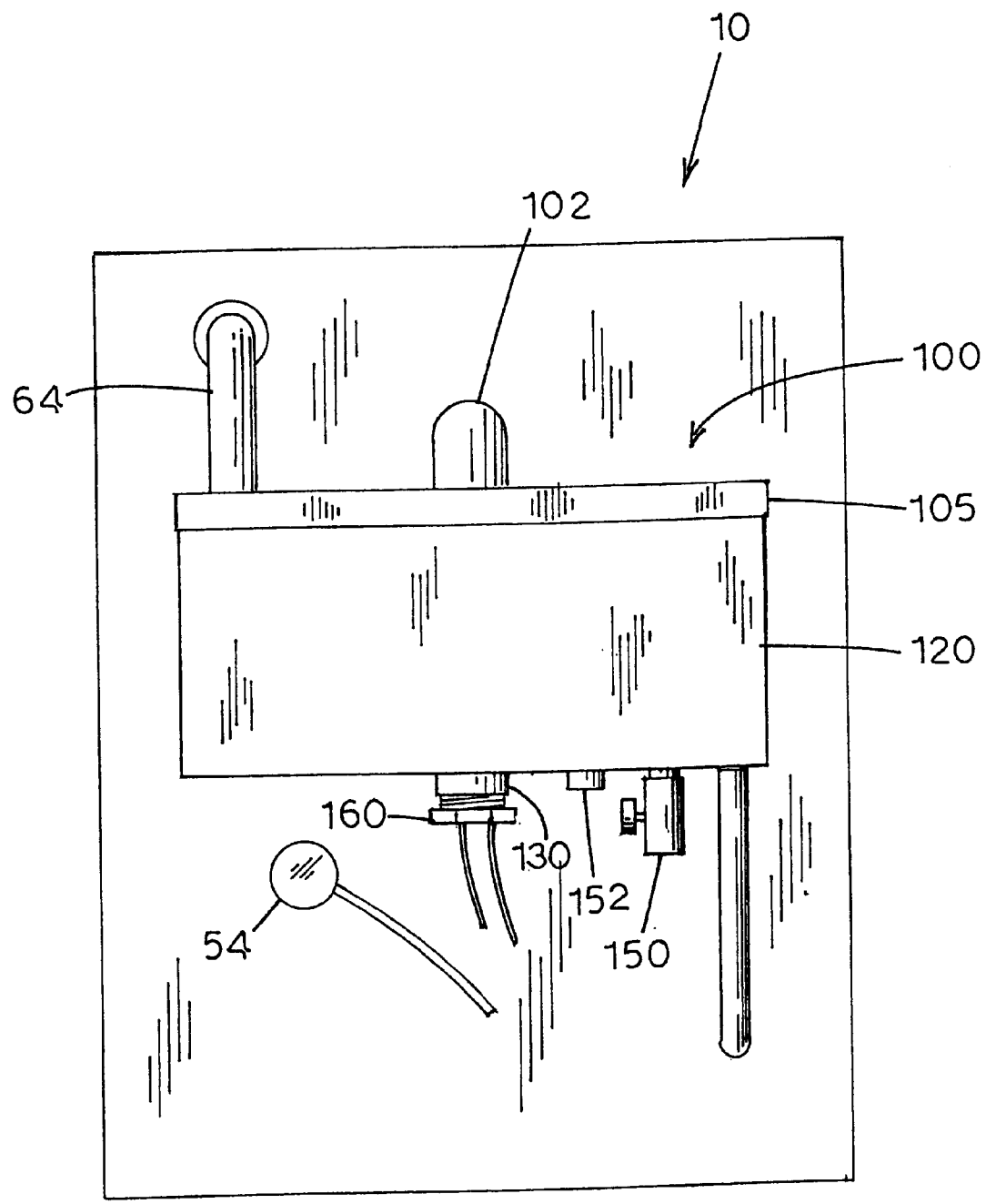
FIG. 4 is a rear view of the steamer oven.

Referring to FIG. 2 and FIG. 4, also connecting to the rear wall of the cooking cavity 30, on a lower portion thereof, is an overflow outlet 50. The overflow outlet 50 is connected to a mechanical steam trap 54 well known in the industry. The overflow outlet 50 is positioned so as to be above the typical water level in the pool 40, but lower than top of the pool 40. In this location, the overflow outlet 50 provides an outlet for water that would otherwise overflow the pool 40.

Referring again to FIG. 1, the controls 20 include an on/off lever switch 22, indicator lights 24, and a timer 26. The on/off lever switch 22 is electrically connected to the steamer's electrical controls and mechanically connected to the drain valve (not shown) so as to close the valve when the on/off lever switch 22 is on. The timer 26 performs no control function. The indicator lights 24 indicate when the steamer is on and warn of a low water condition in the pool 40.

Across the front of the steamer, above the cooking cavity door 39, is a fill trough 60. This fill trough 60 is a roughly rectilinear box having an outlet 62 in the lower portion thereof. The outlet 62 is connected via a fill pipe 64 to the cover 105 of the pressure regulator mechanism 100. Preferably, the fill pipe 64 extends through the cover 105. The fill trough 60 provides a convenient point for a user to add water to the steamer.

Figure 5:
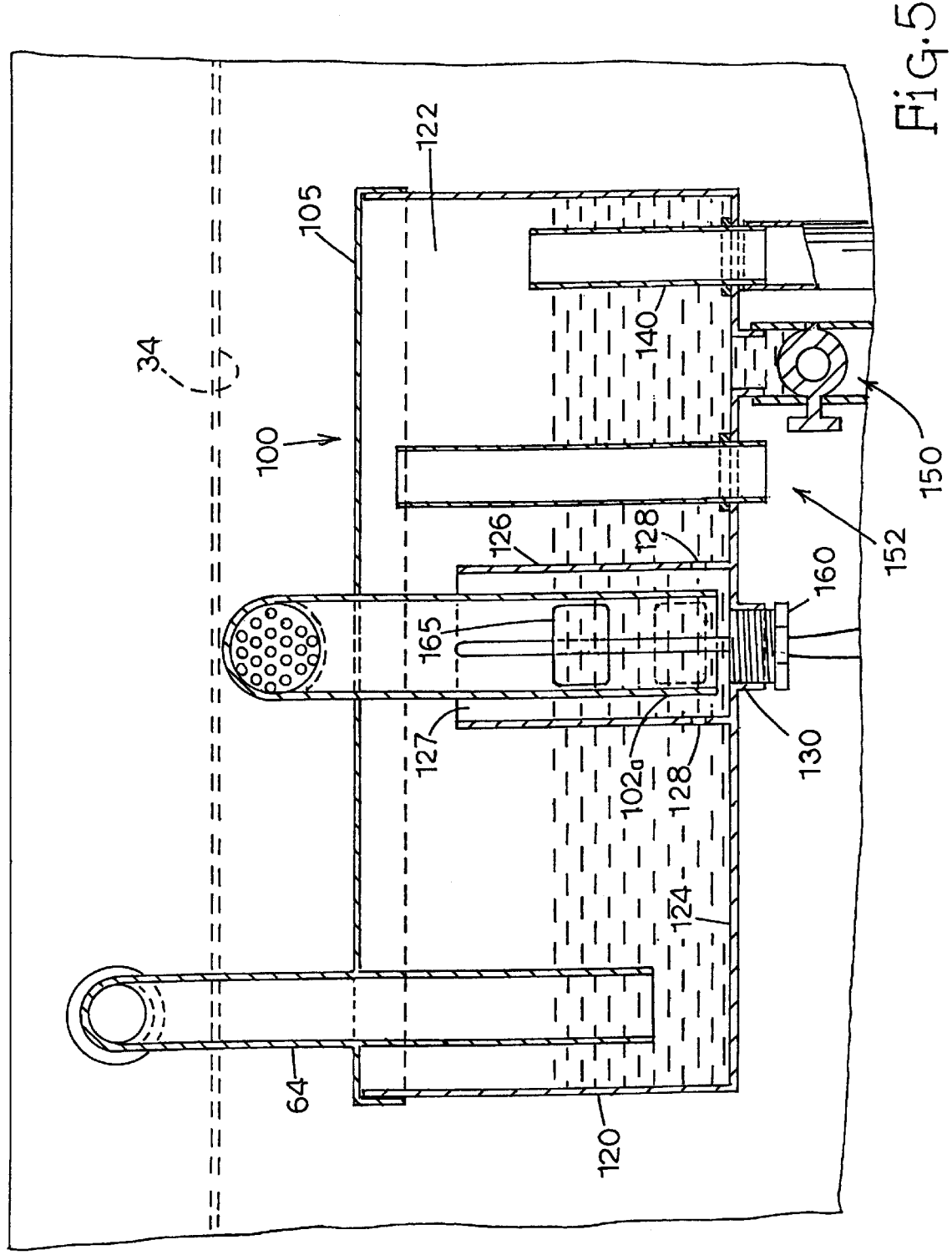
FIG. 5 is a partial rear sectional view along line V—V of FIG. 3.

Referring now to FIGS. 3, 4, and 5, the pressure regulator mechanism 100 includes the lower portion of the steam outlet conduit 102a, a reservoir 120, a cover 105, a baffle wall 126, an overflow tube 140, a reservoir drain valve 150, a vent 152, and a float switch 160. The pressure regulator mechanism 100 can best be understood as a water seal that blocks the terminal end of the steam outlet conduit 102 coupled with a float switch 160 to monitor the pressure inside the cooking cavity 30 indirectly by monitoring the water level in the conduit 102. Additionally, the pressure regulator mechanism 100 provides a means for recycling water from steam condensate that would otherwise be lost out the steam outlet conduit 102.

The reservoir 120 is a rectilinear box open at the top which is removably attached to the rear of the steamer 10. The conduit 102 terminates in the reservoir 120 above the reservoir bottom 124 and below the normal water level in the reservoir 120. Internal to the reservoir 120, and attached to the reservoir bottom 124, is a baffle wall 126 which surrounds the conduit 102. The space between the conduit 102 and the baffle wall 126 is called the baffle channel 127. The baffle wall 126 has a plurality of fill holes 128, preferably two, that interconnect the reservoir 120 and the baffle channel 127. Preferably, the conduit 102, conduit lower portion 102a, and the baffle wall 126 are all round. Centered within the baffle wall 126 is a threaded hole 130 extending through the reservoir bottom 124 for attaching the float switch 160. The float switch 160 is attached to the reservoir bottom 124 via the threaded hole 130 in a watertight fashion and extends upwardly into the steam outlet conduit 102 when the reservoir 120 is attached to the rear of the steamer 10.

The reservoir 120 is capped by a cover 105. Preferably, the cover 105 is welded to the conduit 102 and includes on its underside a sealing gasket (not shown) for sealing the joint between the cover 105 and the reservoir 120, so as to prevent water from the reservoir 120 from splashing out. In addition, the cover 105 is connected to the fill trough outlet 62 via the fill pipe 64 so as to allow water from the fill trough 60 to flow into the reservoir 120.

Protruding up from the bottom of the reservoir 124 is an overflow tube 140 and a vent 152. The top of the overflow tube 140 is positioned at the desired water level for the reservoir 120. The overflow tube 140 is connected to the cooking cavity drain 42 via the T-junction 44 upstream from the drain valve. In this manner, water from the reservoir 120 that overflows into the overflow tube 140 is recycled back to the cooking cavity pool 40 via the cooking cavity drain 42. The top of the vent 152 is positioned above the highest expected water level in the reservoir 120, but below the underside of the cover 105. The vent 152 connects to the atmosphere.

When water is added to the reservoir 120, the space inside the reservoir 120 above the water and below the cover 105 defines a variable reservoir air gap 122. As will be described later, the water level in the reservoir 120 should not rise significantly above the overflow pipe 140; thus, the reservoir air gap 122 typically extends from the underside of the cover 105 at least as far as the top of the overflow tube 140. The reservoir air gap 122 is connected to the atmosphere via the vent 152 for venting purposes.

Connected to the bottom of the reservoir 124 is a reservoir drain valve 150 for draining the reservoir 120. Many common types of drain valves 150 known in the art are suitable including ball valves, petcocks, and the like. Because the overflow tube 140 extends above the bottom of the reservoir 124, the reservoir 120 cannot be drained via the overflow tube 140. Instead, the reservoir 120 is drained via the reservoir drain valve 150.

The float switch 160 is a normally open type common in the industry. The float switch 160 has a sealable mounting means with a stem extending up therefrom and a float 165 riding on the stem. The float switch 160 creates an electrical connection when the float 165 is above a predetermined level. When the float 165 is in the low position, such as when it is not floated, the float switch 160 is open. This position is indicated by the phantom lines in FIG. 5. When the float 165 rises to a predetermined level the float switch 160 closes. In normal operation, the float switch 160 is connected to the heating elements 46 such that when the float switch 160 is open, the heating elements 46 are not powered, and when the float switch 160 is closed, the heating elements 46 can be powered.

To use the steam oven 10, a user turns the unit on and adds water to the fill trough 60. This water is directed to the reservoir 120 of the pressure regulator mechanism 100 via the fill trough outlet 62. As water fills the reservoir 120, some of the water flows into the baffle channel 127 via the fill holes 128 of the baffle wall 126. Because the conduit 102 does not extend all the way to the bottom of the reservoir 124, water also flows from the baffle channel 127 up into the conduit 102, or more particularly into the lower conduit portion 102a. Once equilibrium is reached, the water level in the reservoir 120, the baffle channel 127, and the conduit 102 should all be equal. The water in the conduit 102 will cause the float 165 of the float switch 160 to rise. This initial level is in the operating range of the float switch 160 such that the float switch 160 is closed.

Once the water level in the reservoir 120 rises to the level of the overflow tube 140, water will enter the overflow tube 140. Assuming the on/off switch 22 is turned on, thereby closing the drain valve, the water from the overflow tube 140 will flow into the pool 40 via the T-junction 44 and the pool drain 42. Thus, the pool drain 42 can be used to both fill and drain the pool 40.

If the user continues to add water to the fill trough 60, water will flow through the reservoir 120 to the pool 40, raising the water level in the pool 40. The water level in the pool 40 will rise until it reaches the level of the overflow outlet 50, at which point additional water will flow through the overflow outlet 50 to the steam trap 54. The steam trap 54 is a mechanical device which allows cool air and condensate to escape, but stops the flow of hot pure steam in a manner well known in the art.

After sufficient water has been introduced by the user, food to be cooked is placed inside the cooking cavity 30, typically in perforated pans. When the door 39 is closed and the float switch 160 is closed, power is enabled to the heating elements 46. The heating elements 46 heat the water in the pool 40 and thereby generate steam. As steam is generated, the steam displaces the cooler air in the cooking cavity 30, which exits the cooking cavity 30 via the overflow outlet 50 and the steam trap 54. At some point, steam will begin flowing through the steam trap 54 and cause the trap to close.

Once the steam trap 54 closes, pressure will begin to build in the cooking cavity 30. At first, the pressure will increase very slowly because the food is absorbing most of the steam heat. As the food heats up, the increase may be more rapid. This pressure will be communicated, via the steam outlet conduit 102, to the pressure regulator mechanism 100. The water in the lower portion of the conduit 102a creates a water seal which prevents the steam pressure from escaping. Increasing pressure will cause the water level in the conduit 102 to drop until a low level is reached. This low level is the point at which the float switch 160 opens; this position is indicated in FIG. 5 by phantom lines. When the float switch 160 opens, the heating elements 46 are turned off, thereby stopping the production of steam. Thus, it is expected that steam generation will cease before the water seal is broken.

However, it is possible that some delay will be experienced, during which steam will continue to be produced, due to the latent heat of the heating elements 46 or the like. If steam generation continues, then the water seal may be intermittently broken, relieving pressure in the conduit 102 and cooking cavity 30. Once the pressure is relieved, the water seal should re-establish itself as water flows back into the conduit lower portion 102a from the baffle channel 127, as described below.

Water displaced from the conduit 102 by the steam pressure flows into the baffle channel 127. This water causes the level in the baffle channel 127 to rise which in turn causes the water level in the reservoir 120 to also rise due to the communication between the reservoir 120 and the baffle channel 127 via the fill holes 128. If the water level in the reservoir 120 rises sufficiently, some water will flow from the overflow tube 140 into the cooking cavity pool 40.

Once steam generation has stopped, the pressure in the cooking cavity 30 will drop as the steam present in the cooking cavity 30 condenses or is absorbed. As such, the pressure in the steam outlet conduit 102 will drop, allowing the water level in the conduit 102 to rise. When the water level rises enough, the float switch 160 will close, thereby activating the heating elements 46 so as to generate more steam.

As the pressure in the cooking cavity 30 falls, water is pulled from the baffle channel 127 into the conduit 102. This causes the level in the baffle channel 127 to fall which in turn causes the water level in the reservoir 120 to also fall. Thus, the water level in the reservoir 120 rises and falls in direct relation to the pressure in the cooking cavity 30 while the water level in the conduit 102 rises and falls in inverse relation to the pressure in the cooking cavity 30.

In this manner, the steam pressure in the cooking cavity 30 will be regulated by alternatively turning on and off the heating elements 46 in response to the water level in the steam outlet conduit 102. Because the water level in the conduit 102 is an indirect measurement of the excess steam being generated, the present invention regulates steam generation based on need, rather than continuously.

In an alternative embodiment, the steamer 10 includes an optional idle heating element (not shown) disposed proximate to the main heating elements. This idle element is connected to the float switch 160 so that power to the idle heating element is enabled when the float switch 160 is open and disabled when the float switch 160 is closed. The purpose of the idle element is to generate a small amount of steam while the main heating elements are off. By doing so, it is intended that the idle element will supply just enough new steam to counter-balance the steam lost from cooling heat loss when the cooking cavity 30 contains no food. By using an idle element in this fashion, the main heating elements are not cycled on and off as frequently, thereby increasing their life.

In another embodiment, the idle heating element is connected to the temperature limit switches and a door-open switch (not shown) so that the idle heating element runs continuously when the steamer 10 is turned on unless either switch is open.

As can be appreciated, it is important to have water in the conduit 102 so as to create a low pressure seal and to thereby cause the float 165 of the float switch 160 to move in response to pressure variations within the conduit 102. In some situations, the pressure in the cooking cavity 30, and hence the conduit 102, will be high enough to force all water from the conduit 102, thereby breaking the seal. If the pressure rise is gradual, then the any steam released from the conduit 102 will simply bubble up the baffle channel 127 to the reservoir air gap 122 without causing the baffle channel 127 to overflow. This event is referred to as burping. If the reservoir 120 was sealed, this would cause the pressure in the reservoir 120 to rise. However, in this embodiment, the reservoir 120 is not sealed; the reservoir air gap 122 is vented to the atmosphere through the vent 152. In some embodiments, the cover 105 does not form an air-tight seal with the reservoir 120 and the reservoir air gap 122 is also vented out through any gaps between the reservoir 120 and the cover 105. In some higher pressure situations, the reservoir air gap 122 may also be vented through the fill pipe 64.

After the burp, the water in the baffle channel 127 will reform the water seal. Thus, it is anticipated that enough water will remain in the baffle channel 127 so that some will flow into to lower conduit portion 102a so as to reform the water seal in normal operation.

Unlike the gradual pressure rise described above, when the door 39 is slammed shut, a sudden surge of pressure is created. This surge may push all water from the conduit 102 and blow the baffle channel 127 clear of water, creating a clear air path from the cooking cavity 30 to the reservoir air gap 122. Once the water is pushed from the conduit 102, the pressure should be rapidly relieved into the atmosphere via the reservoir air gap 122. This ability to vent the air trapped by closing the door 39, while not required, is advantageous in that it allows efficient cooking to begin more quickly.

When the water seal is broken after door closing, it must be reestablished in order for the pressure regulator mechanism 100 to function properly. The fill holes 128 provide a route for water from the reservoir 120 to reach the conduit 102 and reestablish the water seal. When the pressure is released, water from the reservoir 120 will flow through the fill holes 128 and refill the baffle channel 127 and the conduit 102 until an equilibrium level is reached. This new level should be within the operating range of the float switch 160. This outcome is more likely when the ratio of the relative combined volume of the normally filled portions of the conduit 102 and baffle channel 127 to the surface area of the reservoir 120 is kept low. In other words, the refill operation works best when the water displaced from the conduit 102 and baffle channel 127 causes only a small increase in the reservoir's 120 level.

In an alternative embodiment, the heating elements 46 are controlled as described above, but a separate control circuit causes the main heating elements to be powered for a short time period after the door 39 is closed, such as one minute, regardless of the position of the float switch 160. The purpose of this function is to push cold air out of the cooking cavity 30 more quickly.

Figure 6:
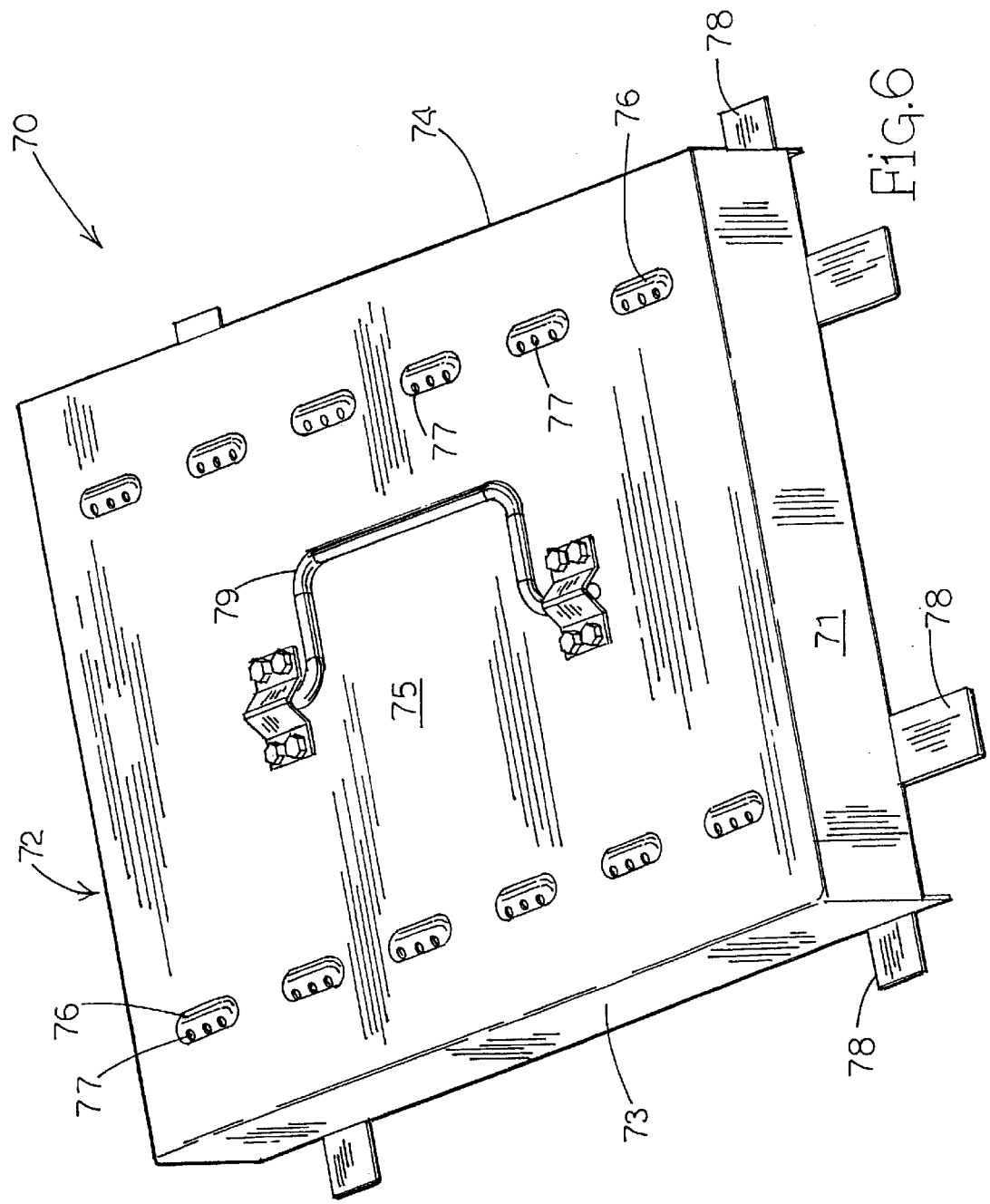
FIG. 6 is a perspective view of the optional pool cover.

In an alternative embodiment, the steam cooker 10 includes an optional pool cover 70 as shown in FIG. 6. The pool cover 70 has a front 71, a back 72, sides 73,74, and a top 75. The pool cover top 75 includes a plurality of embossments 76 having flow holes 77 therein. The embossments 76 are preferably arranged in two rows and the flow holes 77 are preferably pointing all in the same direction, at an upward angle with respect to the plane of the pool cover top 75. Attached to the pool cover top 75 is an optional pool cover handle 79 to facilitate removal of the pool cover 70. Because the pool 40 is preferably tilted toward the left rear corner as described above, the left side 73 of the pool cover 70 is preferably higher than the right side 74 so that the pool cover top 75 will be level when the pool cover 70 is installed in the pool 40. A plurality of short stabilizer legs 78 extend at approximately 90° angles from the front 71 and sides 73,74 of the pool cover 70. These stabilizer legs 78 help support and position the pool cover 70 within the pool 40. With the pool cover 70 in position within the pool 40 there is preferably a space formed between the front 71 and sides 73,74 of the pool cover 70 and the sides of the pool 40. Water may be added directly to this space if desired. In addition, the front 71 and back 72 of the pool cover 70 are preferably slightly shorter in height than the right side 74 so as to allow water to flow within the pool 40 between the space and under the pool cover 70.

The pool cover 70 helps to generate steam flow within the cooking cavity 30 which in turn helps decrease cooking times. The water in the pool 40 is substantially covered by the pool cover 70. When the water level in the pool 40 is higher than the lower portions of the sides 73,74, front 71, and back 72 of the pool cover 70, steam generated underneath the pool cover 70 is slightly trapped between the surface of the water in the pool 40 and the underside of the pool cover 70, creating a slight pressure build-up. This steam pressure build-up is relieved by the steam flowing through the flow holes 77. Because the flow holes 77 are angled, this directed flow of steam through the flow holes 77 into the main cocking cavity 30 creates a circulating flow within the cooking cavity 30. This flow is believed to create a more uniform steam environment within the cooking cavity 30 and to promote better contact between the food and the steam.

In another embodiment, the steam outlet conduit 102 includes a small vent hole 80 as shown in phantom lines in FIG. 3. This vent hole 80 further aids in venting any air trapped in the cooking cavity 30 by closing the door 39 and thereby helps efficient cooking to begin more quickly. The vent hole 80 also helps prevent stagnation in the cooking cavity 30 by promoting an upward steam flow. It is believed that any small pressure release through the vent hole 80 will not adversely affect the operation of the pressure regulator mechanism 100. Further, it is not believed that steam condensate in the steam outlet conduit 102 will escape through the vent hole 80.

A steam cooker 10 equipped with the pressure regulator mechanism 100 described above both cooks food more efficiently and recycles condensed steam. The recycling is accomplished via two main routes. First, steam condensing on the food or the sides of the cooking cavity 30 can simply fall back into the pool 40 to be reused. This is a big advantage over steam cookers having separate steam generation chambers. Second, steam condensing in the steam outlet conduit 102 will either drip into the pool 40 or join the water in the conduit 102. As more and more steam condenses in the conduit 102, the overall reservoir 120 water level will rise due to the interconnection via the baffle fill holes 128. Excess water from the reservoir 120 is routed back to the pool 40 via the overflow tube 140 and T-junction 44. Recycled water typically contains much lower levels of minerals which lead to scaling which must be cleaned. Thus the steamer 10 of the present invention can recycle water, thereby consuming less water and lessening the need for cleaning. In addition, the steamer of the present invention is more compact because steam is generated directly inside the cooking cavity 30 rather than in separate steam generation chambers.

It is anticipated that the steamer 10 of the present invention will generate steam pressures of not more than about five inches of water. As such, no special pressure vessel structure or certification should be required.

As an example, a steam oven 10 of the present invention can be built using a cooking cavity 30 of approximately 2.1 cubic feet of volume; a pool 40 of approximately 2.2 gallons; three main heating elements of 2675 watts; an idle heating element of 375 watts; a steam outlet conduit 102 of 1.5 inch outer diameter and 0.049 wall thickness and having a 6½ inch downward section; an overflow outlet 50 of ½ inch diameter; a steam trap 54, model 8C made by ITT- Hoffman of Chicago, Ill.; a fill trough 60 of approximately ¼ gallon having an outlet 62 of ¾ inch diameter; a reservoir 120 of approximately 0.56 gallons; a baffle wall 126 of two inch diameter having two fill holes 128 of 1/16 inch diameter and extending 3/16 inch up from the reservoir bottom 124; a ¾ inch diameter overflow tube 140 extending four inches up from the reservoir bottom 124; a ¾ inch diameter vent 152 extending five inches up from the reservoir bottom 124; a model LS-300 normally open float switch 160 made by Gems Sensors of Plainville, Conn. The optional vent hole 80 may be of ¼ inch diameter. The optional pool cover 70 may have twelve embossments 76, approximately ½ inch by 1¼ inch obround by 0.14 inch high, arranged in two rows with three 0.156 inch diameter holes each and a left side 73 of 2.3 inches and a right side 74 of 1.9 inches and stabilizer legs of 0.9 inches on the side and 1⅞ inches in front.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What we claim is:

1. A steam oven for cooking food, comprising:
    a) a cooking cavity having a floor;
    b) a heating element for heating water into steam;
    c) a steam outlet passage;
    d) a pressure sensor in communication with said steam outlet passage;
    e) an overflow connecting said steam outlet passage to said cooking cavity, said overflow routing condensed steam from said steam outlet passage to said cooking cavity.
    f) wherein said pressure sensor helps regulate the operation of said heating element, thereby helping to control the pressure within said cooking cavity.

2. The steam oven of claim 1 wherein said cooking cavity further includes a pool formed in said floor for holding water to be heated into steam.

3. The steam oven of claim 2 wherein said heating element is disposed below said pool.

4. A steam oven for cooking food having a front and a rear, comprising:
    a) a cooking cavity having a floor;
    b) a heating element for heating water into steam;
    c) a fluid reservoir having water therein;
    d) a steam outlet passage connecting said cooking cavity to said reservoir;
    e) a float switch disposed in said steam outlet passage, said float switch operable to shut off said heating element when the pressure in said cooking cavity exceeds a pre-determined level.

5. A method of operating a steam oven having a cooking cavity having a pool therein and a heating element, comprising:
    a) adding a fluid to the pool;
    b) heating the said fluid in the pool to generate steam;
    c) outletting a portion of said steam to a steam outlet passage;
    d) thereafter, sensing the pressure of said steam in said steam outlet passage;
    e) turning off said heating element when said pressure rises above a pre-determined level;
    f) condensing steam within said steam outlet passage to form water and routing at least a portion of said water to said pool.

* * * * *